Jan. 7, 1936.  W. H. TOY  2,027,071
THERMOSTATIC ELECTRIC CIRCUIT CONTROL APPARATUS
Filed Dec. 8, 1933
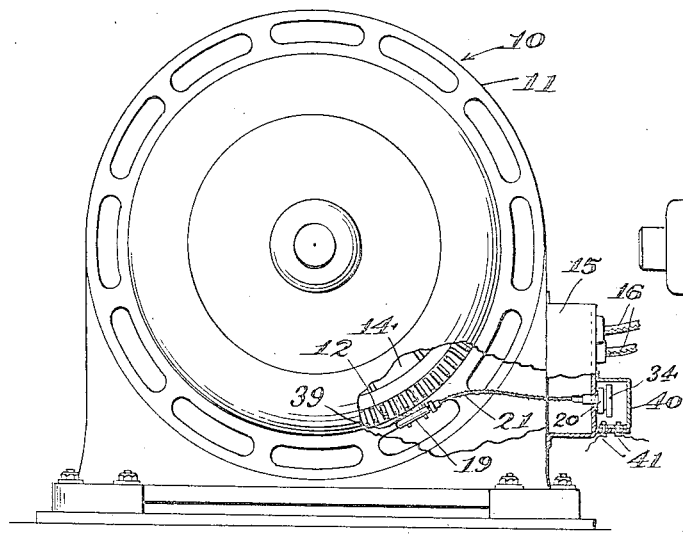
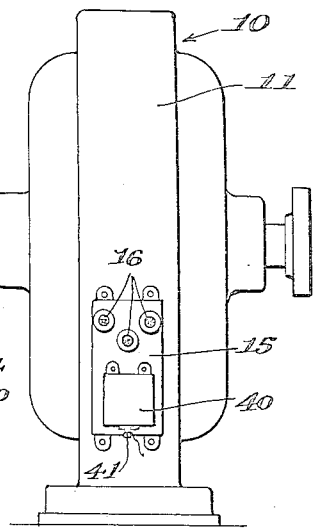
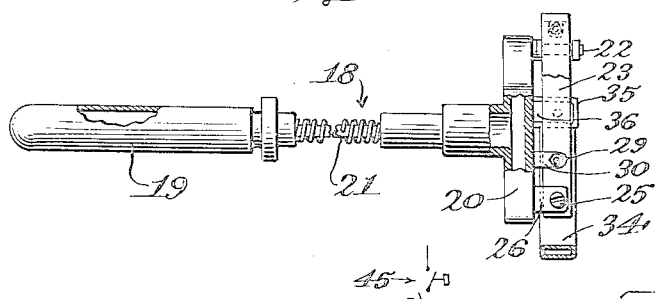
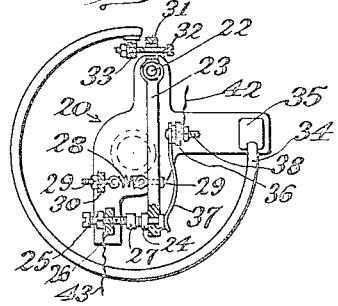
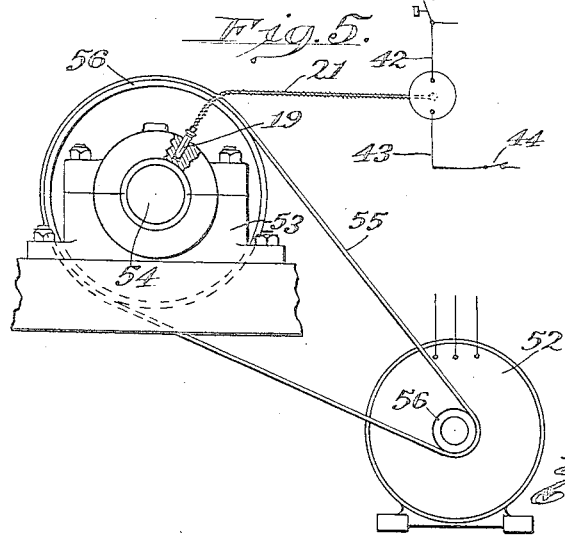
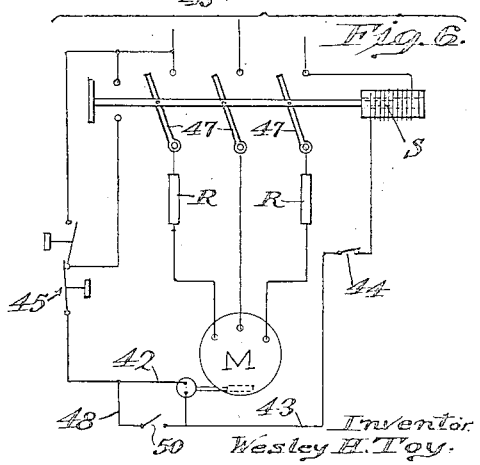
Inventor
Wesley H. Toy Patented Jan. 7, 1936

2,027,071

UNITED STATES PATENT OFFICE 2,027,071

THERMOSTATIC ELECTRIC CIRCUIT CONTROL APPARATUS

Wesley Hughs Toy, Long Beach, Calif., assignor of one-half to Clarence W. Hoefer, Santa Ana, Calif.

Application December 8, 1933, Serial No. 701,455

1 Claim. (Cl. 200—140)

This invention relates to electrical apparatus and more particularly a protective device for the same. It is well understood by electricians that if electric motors are subjected to an overload the field coils or windings become overheated and should a motor be allowed to run under such conditions it eventually results in burning up of said coils.

Heretofore apparatus has been devised to break the circuit to motors operating under the above condition but have been operable by variation of the current.

While such devices serve their intended purpose they only break the circuit under variation in the current and are not controlled in any way by heat generated in the field coils of the motor itself.

This feature of the above type of apparatus is objectionable for the reason that if heat is generated gradually within the motor the field coils become damaged or burnt out.

Further, such apparatus must be manually reset to restore the circuit after being broken by the same.

It is therefore the object of the present invention to provide an apparatus of the character referred to operable by heat generated in a motor or other electrical apparatus and which will automatically break the circuit thereto before the temperature reaches a danger point and restore the circuit after the motor has cooled sufficiently to eliminate immediate danger due to burning of the electrical elements therein.

Another object is to provide a thermostatic electrical circuit control apparatus that automatically breaks the circuit to an electric motor and be operable by heat generated in the apparatus driven thereby.

Other objects and advantages will be apparent from the following description, reference being had to the accompanying drawing, in which:

Fig. 1 is a side elevation of a conventional electric motor showing the apparatus of the invention in operative position in connection therewith.

Fig. 2 is an end elevation of the motor.

Fig. 3 is a side elevation of the improved circuit control apparatus, parts being shown in section.

Fig. 4 is a view in elevation of the circuit control apparatus.

Fig. 5 is a view illustrating another adaptation of the apparatus of the invention.

Fig. 6 is an electrical diagram showing the apparatus of the invention incorporated with a conventional motor starting and circuit breaking system.

Referring more specifically to the drawing, 10 designates a conventional electric motor that comprises a housing 11, a field winding 12 and a rotor or armature 14.

Mounted on the motor housing, preferably on one end thereof, is a casing 15 that receives the terminals of the electric conductors indicated at 16.

Referring more specifically to Figs. 3 and 4, the numeral 18 generally designates the improved circuit control apparatus which includes a hollow cylinder 19 closed at one end and a hollow body member 20 that are interconnected by a flexible tube 21.

Pivotally mounted on the body 20 adjacent one end thereof as indicated at 22 is a lever 23 formed of insulating material that carries a contact point 24 at the opposite end to said pivot.

Adjustably mounted, preferably by a screw 25 threaded in a lug 26 formed on the face of the body is a contact 27. The contacts 24 and 27 are normally held in engagement with each other by a retractile coil spring 28, the opposite ends of which are connected by eye bolts 29 which in turn are connected respectively to the lever 23 and bracket 30 secured to the body.

Slidably mounted in an opening 31 formed in the lever 23 at a point beyond the pivot 22 is a pin or the like 32 that threadedly engages a block 33 which is secured to the free end of a Bourdon tube designated at 34.

The opposite end of the Bourbon tube is connected to a rigid hollow member 35 that communicates with the interior of the body. It will be understood that member 19 should be partially filled or charged with a heat responsive liquid or gas before sealing the parts above described.

Secured to a block 36 formed of insulation material that is secured to the body is a flexible copper terminal 37, the opposite end of which engages the contact 24 and mounted in said block is a binding post 38. The flexible terminal serves as conductor between contact 24 and binding post 38 when said contact is in engagement with the contact 26, also to permit movement of the lever.

Referring to Fig. 1, the member 19 is adapted to be mounted on the field coils of the motor and preferably secured to the periphery thereof by cement or the like, indicated at 39, while the body member 20 is preferably mounted in housing 40 secured to the conduit casing 15.

Secured to the housing and insulated therefrom is a pair of binding posts 41 that are adapted to be connected through conductors indicated at 42 and 43 to the screw 25 and binding post 38 of the device.

Referring to Fig. 6, the conductors may extend to and be connected to one of the terminals of the switches 44 and 45 of a conventional motor control circuit or system.

In the above system the switch 44 is automatically operated by relays indicated at R and is in series with the coil of a solenoid S that serves to close the switches 47 connecting the main circuit to the motor.

The switch 45 serves to momentarily close the circuit through the coil of the solenoid in the usual manner.

During or as long as the motor is operating under normal conditions, i. e. when not operating beyond its rated capacity, the contacts 24 and 27 remain in contact. However, if the motor should be subjected to momentary overload the relays will then function to break the circuit to the motor through the switch 44.

Under conditions where the motor is subjected to constant overload (not sufficient to operate the relays) heat then generated in the field coils will be transmitted to and cause the fluid within the cylinder 19 to expand.

Expansion of this fluid will tend to straighten the Bourdon tube, the action of which will cause the pin 32 to move in the slot 21 or until its head contacts with the lever whereupon said lever will be turned and open or separate the contact points 24 and 27 and break the control circuit to the motor, which in turn breaks the main circuit to the motor.

Movement of the pin 32 in relation to the lever is provided in order to prevent premature breaking of the circuit, also to cause a quick separation of the contact points 24 and 27.

Under conditions where it is essential that the motor run constantly, even though operating under an overload, a shunt circuit indicated at 48 controlled by a switch 50 may be provided. In such instances the switch 50 should be locked in open position and only closed by an unauthorized person. It will be understood that when the motor runs under such conditions it should be kept cool by an air blast or the like.

Referring to Fig. 5, the apparatus is shown in connection with a motor 52 and the bearing 53 of a shaft 54 driven thereby through a belt 55 and pulleys 56.

In this instance the cylinder 19 is disposed in an opening formed in the bearing while the body 20 may be mounted in a housing at a point remote therefrom with the conductors 42 and 43 leading to the control circuit as shown in Fig. 6.

The apparatus thus installed operates in the same manner as that above described except that the control circuit to the motor is broken thereby under conditions when the bearing becomes hot from lack of lubrication or other causes.

It will be apparent that the apparatus may be employed to make and break the circuit to electric machines or appliances other than motors.

It will also be understood that when the apparatus is used in connection with motors or appliances that operate on a comparatively low voltage current, the contacts 24 and 27 may be directly connected to or interposed in one of the conductors leading thereto from the source of current.

I claim:

A device of the character described comprising a hollow body member containing a heat responsive fluid, a flexible conduit closed at its outer end secured to and communicating with the interior of said hollow body member, a lever formed of insulating material pivotally mounted on said hollow body member adjacent one end thereof and carrying a contact point at the opposite end to its pivot point, an adjustable screw contact mounted on said body member, a retractile coil spring secured to said lever and normally urging the contact on said lever into engagement with said screw contact, a Bourdon tube secured and communicating with said hollow body member at one end thereof, a pin having a head slidably mounted in an opening formed in said lever at a point beyond the pivot and screw threadedly engaging a block screwed to the free end of said Bourdon tube, for the purpose set forth.

WESLEY HUGHS TOY.